US009230297B2

(12) United States Patent
Grossmann et al.

(10) Patent No.: US 9,230,297 B2
(45) Date of Patent: Jan. 5, 2016

(54) SYSTEMS, METHODS, AND COMPUTER PROGRAM PRODUCTS FOR COMPOUND IMAGE DEMOSAICING AND WARPING

(71) Applicants: Etienne G. Grossmann, Redwood City, CA (US); John I. Woodfill, Palo Alto, CA (US); Gaile Gordon, Palo Alto, CA (US)

(72) Inventors: Etienne G. Grossmann, Redwood City, CA (US); John I. Woodfill, Palo Alto, CA (US); Gaile Gordon, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 13/976,851

(22) PCT Filed: Mar. 15, 2013

(86) PCT No.: PCT/US2013/032050
§ 371 (c)(1),
(2) Date: Jun. 27, 2013

(87) PCT Pub. No.: WO2013/169384
PCT Pub. Date: Nov. 14, 2013

(65) Prior Publication Data
US 2014/0056513 A1     Feb. 27, 2014

Related U.S. Application Data

(60) Provisional application No. 61/645,995, filed on May 11, 2012.

(51) Int. Cl.
*G06K 9/00*   (2006.01)
*G06T 3/00*   (2006.01)
*H04N 9/04*   (2006.01)

(52) U.S. Cl.
CPC .............. *G06T 3/0056* (2013.01); *H04N 9/045* (2013.01)

(58) Field of Classification Search
None
See application file for complete search history.

(56) References Cited

U.S. PATENT DOCUMENTS 7,492,396 B2 *   2/2009   Kim et al. ..................... 348/234
2003/0118251 A1   6/2003   Hamza
(Continued)

FOREIGN PATENT DOCUMENTS

EP      2175656 A1      4/2010
WO   2013/169384 A1   11/2013

OTHER PUBLICATIONS

International Search Report and Written Opinion received for PCT Patent Application No. PCT/US2013/032050, mailed on Jun. 28, 2013, 12 pages.
International Preliminary Report on Patentability and Written Opinion received for PCT Patent Application No. PCT/US2013/032050, mailed on Nov. 20, 2014, 9 pages.

(Continued)

*Primary Examiner* — Eueng-Nan Yeh
(74) *Attorney, Agent, or Firm* — Green, Howard & Mughal LLP

(57) ABSTRACT

Methods, systems, and computer program products to obtain a color image from a color filter array, such as, for example, a color filter array comprising a Bayer pattern. A method of image processing includes, for each pixel location (i,j) and for each color channel in a color image, determining a warped location (i',j') in a color filter array, and determining a color value of the color channel at location (i',j') in the color filter array. The method may further include storing the determined color value. The determining of the color value may include interpolating the color value of the color channel at location (i',j') in the color filter array. In this manner, a single interpolation operation set may be needed and an intermediate image may be avoided, saving memory, reducing processing time, minimizing artifacts, and reducing cost.

25 Claims, 17 Drawing Sheets

(56) References Cited

U.S. PATENT DOCUMENTS

2007/0058179 A1\* 3/2007 Kuroki et al. ................. 358/1.2
2008/0122946 A1 5/2008 Sung et al.
2010/0182466 A1 7/2010 Chang et al.
2011/0013056 A1 1/2011 Myhrvold
2011/0090381 A1 4/2011 Côté et al.

OTHER PUBLICATIONS

EP Search Report mailed Oct. 16, 2015, for EP Patent Application No. 13788458.1-1902/2847998.

\* cited by examiner

SYSTEMS, METHODS, AND COMPUTER PROGRAM PRODUCTS FOR COMPOUND IMAGE DEMOSAICING AND WARPING

TECHNICAL FIELD

Embodiments described herein generally relate to image processing.

BACKGROUND

In order to produce color images, such as photograph and video images, demosaicing and image warping are often performed in succession on images resulting in rectified color images.

A demosaicing algorithm is a digital image process that is used to reconstruct a full color image from incomplete color output from an image sensor overlaid with a color filter array in order to render the image into a viewable format. As the raw color image includes an intensity of only one color of the three filter colors (red, blue, and green) per pixel, demosaicing is used to determine intensities of the other two colors for each pixel. Many algorithms exist for demosaicing a color image. These algorithms vary in complexity and may result in a tripling of the data involved.

Image warping is the process of smoothly displacing the pixels in an image. In a warped image, the value at each pixel is usually computed from values sampled in the original image. Since the location in the raw image does not necessarily have integer coordinates, some interpolation is typically needed. Warping is used, for example, to correct for distortions present in an image. An image produced by an optical system is subject to various forms of geometric distortion. The distortion is often significant enough that it is desirable to warp the image into a more usable form. For example, objects in the center of an image obtained using a wide-angle or fish-eye lens will appear enlarged compared to objects at the edges. This is called barrel distortion. Warping the image may correct for the barrel distortion, resulting in a proportionally correct image that would appear to have been produced by a perspective camera. Warping can also be used to correct other types of distortions, or even to purposely cause distortions.

Both demosaicing and warping introduce some image defects, or artifacts, because they typically each involve interpolation. Performing demosaicing and warping individually in succession compounds this issue. In addition to the processing time needed to perform the two operations, demosaicing and warping in succession requires computer memory to store an intermediate image and also requires interpolations being performed twice.

BRIEF DESCRIPTION OF THE DRAWINGS/FIGURES

FIG. 2 illustrates exemplary models of a color filter array showing color value measures of each individual color that may be used to obtain a rectified color image, according to an embodiment.

Figure 1:
FIG. 1 illustrates an exemplary model of a color filter array that may be used to obtain a rectified color image, according to an embodiment.

In the drawings, the leftmost digit(s) of a reference number may identify the drawing in which the reference number first appears.

DETAILED DESCRIPTION

Images

A color or multi-spectral image may consist of many measurements, at each pixel, of the intensity of the light of a certain color reaching that pixel. In most color images, each pixel has a measurement of the intensity of the red light reaching that pixel, a measurement of the green light reaching that pixel, and a measurement of the blue light reaching that pixel. It may be stated that such a color image has a red, green and blue channel. In other types of images, there may be more and/or different channels. In this document, a reference to "c" may refer to a color channel.

In this document, when distinction is not needed, the term "image" may refer to an RGB (red green blue) image or multispectral image or more generally an image with multiple channels.

In this document, a reference to "(i,j)" may refer to a location, or pixel, in an image. A reference to "I" or "J" may each refer to an image, and a reference to "I(i,j,c)" may refer to the value of channel c at column i and row j in image I.

Demosaicing

Many contemporary imaging sensors only produce a single intensity measurement at each pixel, corresponding to one of the channels. For example, in a sensor equipped with a "Bayer pattern" color filter array, each pixel will only measure either the red, green or blue channel. In order to obtain a color or multi-spectral image from the output of such a sensor, it is necessary to somehow estimate the value of the missing channels at each pixel. This process is called demosaicing.

In this document, reference to a "color filter array" may refer to the data, consisting of one measurement per pixel, that are used as input to a demosaicing algorithm. A color filter array may be stored in memory or read directly from the output of an imaging sensor.

In this document, a reference to "A" may refer to a color filter array, and references to "A(i,j)" may refer to the value, or measurement, of pixel (i,j) at column i and row j in color filter array A.

Many algorithms exist for demosaicing a color image. A common method of demosaicing the output of a Bayer pattern imaging sensor consists of copying the available channel to the output image, and interpolating the missing channels from neighboring pixels where those channels are available. The choice and design of an interpolation method has been the subject of much research.

Since demosaicing involves determining values that are not observed, the "true" value will usually differ from the estimated value. In some cases, this discrepancy may introduce undesirable visible artifacts.

Demosaicing a color filter array A may result in an image I. In this document, demosaicing may be considered an operation that performs the following:
1. For each pixel (i,j) and for each channel c of the resulting image I:
   1.1. Determine, by interpolation or copying, the value of channel c at pixel (i,j), and
   1.2. Store the I(i,j,c) value in the resulting image.

At 1.2, I(i,j,c) refers to the value of channel c at pixel (i,j) in image I. The result of this operation is the image I.

FIG. 1 illustrates the layout of a 6-by-6 Bayer color filter array 100, with columns and rows numbered 0 to 5. In this color filter array, A(0,0) is a measurement of red light reaching the location (0,0); A(1,0) is a measurement of green light; A(2,0) is again a measurement of red light, etc., and A(0,1) is a measurement of green light; A(1,1) is a measurement of blue light, A(2,1) is a measurement of green light, etc. In such a color filter array, when i and j are both even, then A(i,j) is a measurement of red. When i and j are both odd, then A(i,j) is a measurement of blue. When either i or j, but not both, are odd, then A(i,j) is a measurement of green. In this way, a Bayer color filter array may be seen as three overlapping grids of pixels, with one grid being red, one being green, and one being blue, as described below with reference to FIG. 2.

FIG. 2 illustrates the red, blue, and green grids 212, 214, 216 taken from the 6-by-6 Bayer pattern of FIG. 1. In FIG. 2, the letters R, G and B represent locations where red, green and blue light are measured, respectively, and the dot notations "." represent locations where no measurement is available for that channel. Each grid is a regular square grid. Note that the green grid is rotated by 45 degrees and twice as dense as the red grid or the blue grid.

Demosaicing will now be described. For the sake of example, it may be assumed without loss of generality that channel 0 is red, channel 1 is green, and channel 2 is blue. It may also be assumed that location (i,j) is not on the border of the array. If i and j are even numbers, the following may be defined:

$$I(i,j,0)=A(i,j) \qquad \text{Eq. 1}$$

$$I(i,j,1)=(A(i-1,j)+A(i+1,j)+A(i,j-1)+A(i,j+1))/4 \qquad \text{Eq. 2}$$

$$I(i,j,2)=(A(i-1,j-1)+A(i-1,j+1)+A(i+1,j-1)+A(i+1,j+1))/4 \qquad \text{Eq. 3}$$

In these definitions, it is clear that I(i,j,0) is a measurement of red; that I(i,j,1) is computed from measurements of green exclusively; and that I(i,j,2) is computed from measurements of blue exclusively.

If i is even and j is odd, the following may be defined:

$$I(i,j,0)=(A(i,j-1)+A(i,j+1))/2 \qquad \text{Eq. 4}$$

$$I(i,j,1)=A(i,j) \qquad \text{Eq. 5}$$

$$I(i,j,2)=(A(i-1,j)+A(i+1,j))/2 \qquad \text{Eq. 6}$$

If i is odd and j is even, the following may be defined:

$$I(i,j,0)=(A(i-1,j)+A(i+1,j))/2 \qquad \text{Eq. 7}$$

$$I(i,j,1)=A(i,j) \qquad \text{Eq. 8}$$

$$I(i,j,2)=(A(i,j-1)+A(i,j+1))/2 \qquad \text{Eq. 9}$$

If i is odd and j is odd, the following may be defined:

$$I(i,j,0)=(A(i-1,j-1)+A(i-1,j+1)+A(i+1,j-1)+A(i+1,j+1))/4 \qquad \text{Eq. 10}$$

$$I(i,j,1)=(A(i-1,j)+A(i+1,j)+A(i,j-1)+A(i,j+1))/4 \qquad \text{Eq. 11}$$

$$I(i,j,2)=A(i,j) \qquad \text{Eq. 12}$$

This method of demosaicing is one of the many methods that are well known to one skilled in the art of image processing or of digital photography.

It is well known to one skilled in the art of image processing or digital photography that this method of demosaicing, like all demosaicing methods, may occasionally introduce undesirable visible artifacts in the resulting image.

Interpolation

In this document, the term "interpolation" may refer to an operation that determines the value of a color channel c, at a location (i,j) in an image I, when the numbers i and j are not necessarily integer numbers. When i or j are not integer numbers, the sought value is not stored in the image. Thus, it becomes necessary to estimate the value of color channel c at location (i,j) in image I. This process may be referred to as "determining by interpolation the value I(i,j,c)", or "interpolating I(i,j,c)."

One possible method of interpolation may consist of determining "round(i)" and "round(j)", the nearest integer values to i and j, and then determining the value I(round(i),round(j)). This method may be referred to as "nearest neighbor interpolation."

Example

Bilinear interpolation of channel c of an image I at a location (i',j'), where i' and j' are not necessarily integer numbers. The notation [i'] represents the largest integer number not less than i', and likewise [j'] represents the largest integer number not less than j'. The interpolated value I(i',j',c) is determined from the four values I([i'],[j'],c), I([i']+1,[j'],c), I([i'],[j']+1,c) and I([i']+1,[j']+1,c), using the expression:

$$I(i', j', c) = \qquad \text{Eq. 13}$$
$$I([i']+1, [j']+1, c)*w_i*w_j + I([i'], [j']+1, c)*(1-w_i)*w_j +$$
$$I([i']+1, [j'], c)*w_i*(1-w_j) +$$
$$I([i'], [j'], c)*(1-w_i)*(1-w_j),$$

where "*" denotes multiplication, $w_i$ is the fractional part of i' (i.e., $w_i$ is equal to i'−[i']), and $w_j$ is the fractional part of j' (i.e., $w_j$ is equal to j'−[j']). This expression is well known to those skilled in the arts of image processing and computer graphics.

Since interpolation involves determining values that are not observed, there exist no "true" values, and different interpolation methods will often obtain different results. In some cases, interpolation may introduce undesirable visible artifacts. In addition, interpolation may exacerbate artifacts that were present in the original image.

One way of viewing an image may be to consider that the image is a function that associates, to an integer location (i,j) and a channel c, a value I(i,j,c). Since the locations (i,j) are pairs of integer numbers, it may be stated that the image (or function) is only defined on a rectangular grid of pixels. The operation of interpolation, then, may allow one to extend the image (or function) to the whole rectangular domain within the original grid of pixels. This insight will be used later in the description of the invention.

Image Warping

The operation of image warping is essentially a transformation from one image into another image as defined by some warping function. Most often a warping function computes, for each location in the new image, the location of that pixel in the original image. Since the locations in the original image do not necessarily have integer coordinates, some interpolation is needed, which may introduce some interpolation artifacts.

A common use of warping is to correct for geometric distortion. An image produced by an optical system may be subject to various forms of geometric distortion. For example, images obtained from fish-eye lenses are often so distorted that they do not appear "natural" to the viewer. In image-based metrology, it is usually necessary to warp the images so they appear to have been produced by a perspective camera. When distortion is significant, and unwanted, it is necessary to somehow undo this distortion. For this purpose, an operation called "image warping" may be used.

Image warping may be used in a wider context than the correction of optical distortion. For example, a class of warping called "homographies" may be applied to make an image appear as if it were produced by a camera with a different orientation (than the camera that produced the original image). Warping may also be applied to make it appear that the original sensor had a different layout (for example a log-polar layout) or a different resolution.

Warping an image I may result in a new image J. In this document, image warping may be considered an operation that performs the following:
1. For each pixel (i,j) and for each channel c in a resulting image J:
    1.1. Determine a warped location (i',j') in the original image I,
    1.2. Determine, by interpolation, the value I(i',j',c) of channel c at pixel (i',j') in image I, and
    1.3. Store value I(i',j',c) at location J(i,j,c) in the output image J.

At 1.1, the location (i',j') may take the form:

$$i'=P(i,j) \quad \text{Eq. 14}$$

$$j'=Q(i,j) \quad \text{Eq. 15}$$

where P and Q are functions. Common classes of functions used may include polynomials and rational functions, but other types of functions have been used, for example to correct for distortions introduced by optical systems. Although one may use the same functions P and Q for all channels, in some cases, for example to correct for color aberration, it may be desirable to use a different function for each channel.

A common example of a pair of simple polynomial functions may be:

$$i'=P(i,j)=i'_0+(1+k_0 r^2)(i-i_0) \quad \text{Eq. 16}$$

$$j'=Q(i,j)=j'_0+(1+k_0 r^2)(j-j_0) \quad \text{Eq. 17}$$

where $$r^2=(i-i_0)^2+(j-j_0)^2, \text{ and}$$

$i_0$, $j_0$, $i'_0$, $j'_0$ and $k_0$ are constants.

At 1.2, since the locations (i',j') are not necessarily integer numbers, one cannot in general copy directly the values from the original image I. It is thus necessary to use interpolation. Any of the many available interpolation methods may be used, for example nearest neighbor interpolation, bilinear interpolation or bicubic interpolation.

Demosaicing and Warping Used Together

Demosaicing and image warping are often applied in succession. Most images produced by digital cameras (e.g., but not limited to, single-lens reflex (SLR), point-and-shoot, camera-phone, webcam, surveillance camera, etc.) are obtained by demosaicing a Bayer color filter array. Whenever image warping is applied to such an image, the operations of demosaicing and warping are thus successively applied in order to produce a warped image.

In order to obtain a warped image J from a color filter array A, the following is usually performed, in what may be referred to as a "classical method" for successively demosaicing a color filter array and warping an image:
    1. Demosaic color filter array A, resulting in image I, and
    2. Warp image I, resulting in warped image J.

In this classical method, one should note that it is necessary to store image I. This storage is needed even when the two operations are performed in quick succession, for example when one only wants to keep the warped image J, and discard the image I. For example, when a camera has a wide-angle or fish-eye lens with known optical distortion, it is possible, and often desirable, to warp the image within the camera. For example, in a SLR or point-and-shoot camera, one would keep the image J in which the lens distortion is corrected, and discard image I. In another example, in a wide-angle surveillance camera, one could transmit only image J and again discard image I. In both cases, however, it is necessary that the camera have temporary memory to store image I. Since memory is costly, the requirement of a temporary memory is a disadvantage.

Another disadvantage of the classical method is that interpolation is performed at two stages of the method: interpolation occurs first during demosaicing, where it may introduce artifacts. Then, during warping, interpolation may introduce new artifacts, in addition to exacerbating the artifacts that were introduced by demosaicing.

Compound Image Demosaicing and Warping

The methods, systems, and computer program products described herein may allow for image demosaicing and warping in such a manner as to reduce the amount of memory and processing time needed, as well as to minimize artifacts and reduce overall cost. Embodiments of these methods, systems, and computer program products are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the scope of the description. It will be apparent to a person skilled in the relevant art that this can also be employed in a variety of other systems and applications than what is described herein.

Figure 3:
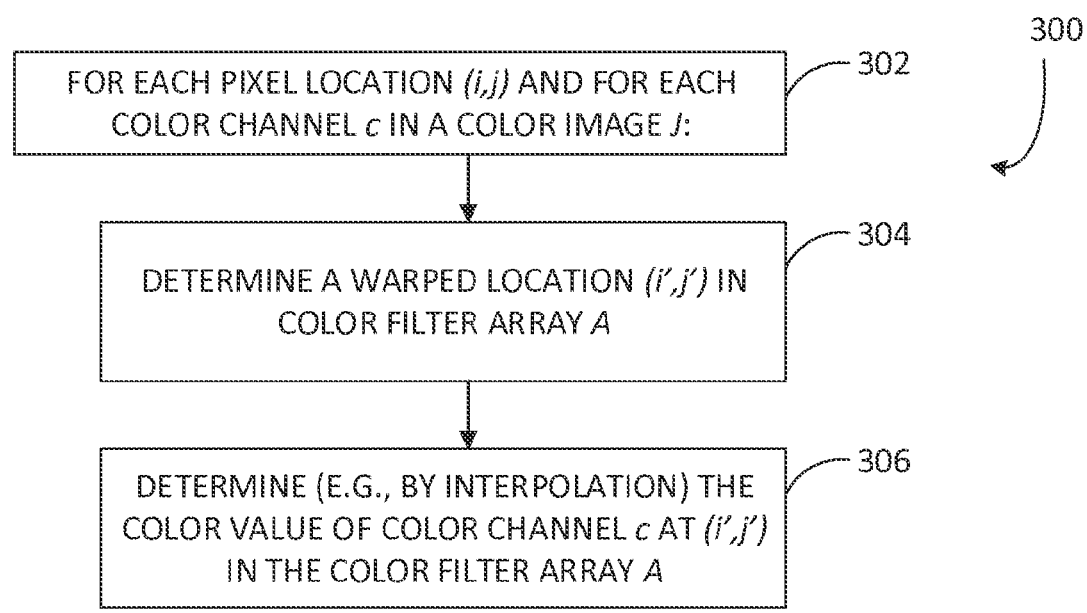
FIG. 3 is a flow chart illustrating a method of compound demosaicing and warping that may be used to obtain a rectified color image from a color filter array, according to an embodiment.

In an embodiment, in order to obtain a warped image J from a color filter array A, the following may be performed, as depicted in FIG. 3 as method 300:

1. For each pixel (I,j) and for each color channel c in color image J (302),
   1.1. Determine a warped location (i',j') in color filter array A (304), and
   1.2. Determine the color value of color channel c at (i',j') in color filter array A (306).

In an embodiment, the above may be performed by a computing device, as described in more detail below. Optionally, the determined color value may be output, or may be stored in, for example, a memory or other storage device of a computing device. In an embodiment, color filter array A may comprise a Bayer pattern, for example, or another type of color filter array pattern.

At 1.1 (302 in FIG. 3), the warped location is determined in the same manner as in ordinary image warping. For example, any class of warping functions P and Q, as discussed above, could be used.

At 1.2 (306 in FIG. 3), interpolation may be used. For example, bilinear interpolation, bicubic interpolation, nearest neighbor interpolation, or another interpolation method may be used. The interpolation method may be slightly different from that performed in ordinary image warping, however, because one does not know the value of each channel c at each location (i,j).

A key insight is that each color channel nevertheless does provide a grid (usually, but not always, rectangular) of measurements. As a consequence, for each color channel, one may interpolate a value for any location within the grid at which measurements of that channel are available.

A description of the determining of the color value of color channel c at (i',j') in color filter array A (1.2/306) follows, according to embodiments. Without loss of generality, this example will use a Bayer color filter array as previously described, and will use bilinear interpolation by way of example. One skilled in the art may readily generalize the following description to other color filter arrays and to other types of interpolation.

The following describes interpolation of the value of color channel 0 (red) at a location (i',j'), where i' and j' are numbers that are not necessarily integers, according to an embodiment. In this example, [[i']] represents the largest even integer number that is not less than i'. Similarly, [[j']] represents the largest even integer number that is not less than j'. The following may then be defined:

$$J(i', j', 0) = A([[i']] + 2, [[j']] + 2) * w_i * w_j +$$
$$A([[i']] + 2, [[j']]) * w_i * (1 - w_j) +$$
$$A([[i']], [[j']] + 2) * (1 - w_i) * w_j +$$
$$A([[i']], [[j']]) * (1 - w_i) * (1 - w_j)$$

Eq. 18 where $w_i$ is equal to (i'−[[i']])/2 and $w_j$ is equal to (j'−[[j']])/2. In this example, it is clear, from the layout of the Bayer color filter array, that A([[i']],[[j']]), A([[i']],[[j']]+2), A([[i']]+2, [[j']]) and A([[i']]+2,[[j']]+2) are all measurements of red light reaching the imaging sensor. Consequently, J(i',j',0) is indeed a measurement of red light. One skilled in the art would readily recognize that J(i'j',0) defined above is the bilinear interpolation at (i',j') of the four measurements A([[i']],[[j']]), A([[i']],[[j']]+2), A([[i']]+2,[[j']]) and A([[i']]+2,[[j']]+2).

The following describes interpolation of the value of color channel 1 (green) at a location (i',j'), where i' and j' are numbers that are not necessarily integers, according to an embodiment. Since green measurements are available on a grid that is rotated by 45 degrees with respect to the grid of the color filter array, the interpolation process may be slightly more complicated than in the case of the red and blue channels.

In order to interpolate the green channel, a change in coordinates may be defined by:

$$u' = i' + j'$$

Eq. 19

$$v' = i' - j'$$

Eq. 20

The above transformation is invertible, the inverse transformation may be shown as follows:

$$i' = (u' + v')/2$$

Eq. 21

$$j' = (u' - v')/2$$

Eq. 22

In this example, it can be seen that the locations at which u' and v' are both odd integer numbers correspond to locations at which either i' or j' is odd, but not both. Conversely, if either i' or j' is odd, but not both, then u' and v' are both odd. Consequently, recalling the layout of the Bayer color filter array, the locations at which u' and v' are both odd integer numbers correspond to locations in the color filter array at which green light is measured.

In this example, [[u']] represents the largest odd integer number that is not less than u'. Similarly, [[v']] represents the largest odd integer number that is not less than v'. The following may then be defined:

$$i'' = ([[u']] + [[v']])/2$$

Eq. 23

$$j'' = ([[u']] - [[v']])/2$$

Eq. 24

By construction, i" and j" are both integer numbers, and location (i',j') is contained within the square defined by the four locations (i",j"), (i"+2,j"), (i"+1,j"−1), (i"+1,j"+1).

In this example, it can also be seen that all the vertices of this square fall on a location where green light is measured in the considered Bayer color filter array.

Continuing this example, the following may be defined:

$$J(i', j', 1) =$$
$$A(i'' + 2, j'') * w_u * w_v + A(i'' + 1, j'' + 1) * w_u * (1 - w_v) +$$
$$A(i'' + 1, j'' - 1) * (1 - w_u) * w_v + A(i'', j'') * (1 - w_u) * (1 - w_v),$$

Eq. 25 where $w_u$ is equal to (u'−[[u']])/2 and $w_v$ is equal to (v'−[[v']])/2. One skilled in the art would readily recognize that J(i',j',1) defined above is the bilinear interpolation at (i',j') of the four measurements A(i",j"), A(i"+1,j"+1), A(i"+1,j"−1) and A(i"+2,j").

The following describes interpolation of the value of color channel 2 (blue) at a location (i',j'), where i' and j' are numbers that are not necessarily integers, according to an embodiment. In this example, [[i']] represents the largest odd integer number that is not less than i'. Similarly, [[j']] represents the largest odd integer number that is not less than j'. The following may then be defined:

$$J(i', j', 2) = A([[[i']]] + 2, [[[j']]] + 2) * w_i * w_j +$$
$$A([[[i']]] + 2, [[[j']]]) * w_i * (1 - w_j) +$$
$$A([[[i']]], [[[j']]] + 2) * (1 - w_i) * w_j +$$
$$A([[[i']]], [[[j']]]) * (1 - w_i) * (1 - w_j)$$

Eq. 26 where $w_i$ is equal to $(i'-[[[i']]])/2$ and $w_j$ is equal to $(j'-[[[j']]])/2$. In this example, it is clear, from the layout of the Bayer color filter array, that $A([[[i']]],[[[j']]])$, $A([[[i']]],[[[j']]]+2)$, $A([[[i']]]+2,[[[j']]])$ and $A([[[i']]]+2,[[[j']]]+2)$ are all measurements of blue light reaching the imaging sensor. Consequently, $J(i',j',2)$ is indeed a measurement of blue light. One skilled in the art would readily recognize that $J(i',j',2)$ defined above is the bilinear interpolation at $(i',j')$ of the four measurements $A([[[i']]],[[[j']]])$, $A([[[i']]],[[[j']]]+2)$, $A([[[i']]]+2,[[[j']]])$ and $A([[[i']]]+2,[[[j']]]+2)$.

Embodiments of the disclosed method that simultaneously perform demosaicing and warping of a Bayer color filter array A that results in a warped image J have now been described.

Contrary to the classical method of demosaicing and warping described earlier, the disclosed method of compound demosaicing and warping may not need an additional intermediary image I. Consequently, additional memory to store image I may not be needed, and thus a system that implements the disclosed method may require less memory than a system that implements the classical method.

In addition, contrary to the classical method of demosaicing and warping, only one interpolation process takes place in the disclosed method. Therefore, exacerbation of interpolation artifacts of one interpolation process during a second interpolation process may be avoided. Since interpolation artifacts are detrimental to image quality, the disclosed method may be preferred over the classical method.

Further Sampling Examples

Another way of describing the above-discussed sampling of locations in a color filter array using bilinear interpolation will now be described. In the following examples, the color filter array used will have the classic Bayer pattern, as shown in FIG. 1. As would be understood by those skilled in the relevant art, other color filter array patterns may also be used with the methods described herein.

Figure 4:
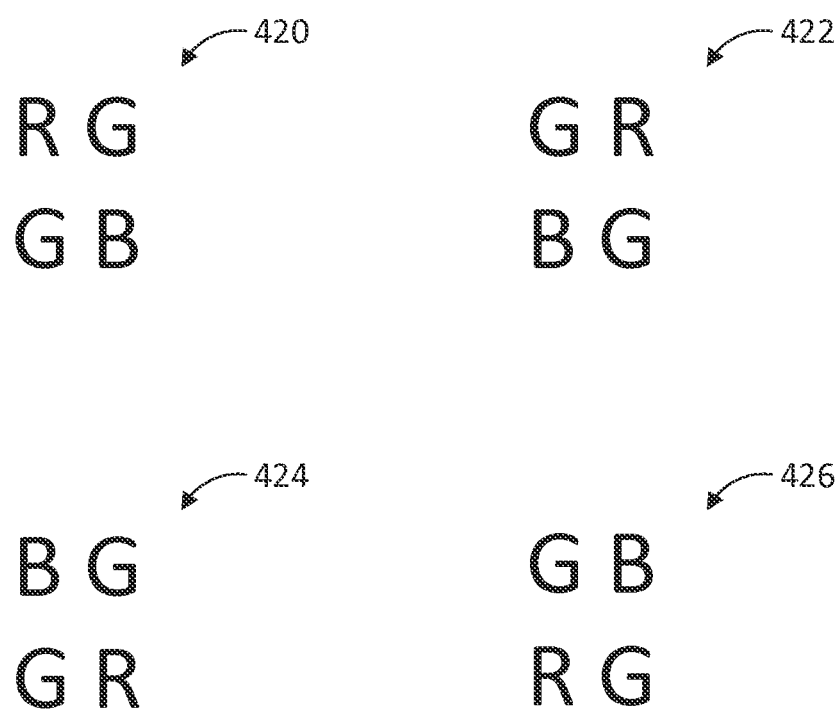
FIG. 4 illustrates exemplary models of pixel quadruplets that may be used to obtain a rectified color image, according to an embodiment.

A main idea behind the following approach is to take into account where in the color filter array (here, a Bayer pattern) one is, and given an understanding of adjacent color pixels, apply an appropriate interpolation to sample red, green, and blue values at the sample point. In an embodiment, an interpolation may be done on a sample point located within a two-by-two quadruplet (or "quad") of pixels. For example, for a Bayer color filter array, a sampled location may fall within one of four possible types of quads 420, 422, 424, and 426, as shown in FIG. 4. For the sake of example, a sampling of a pixel located within a quad 420 will now be described.

Figure 5:
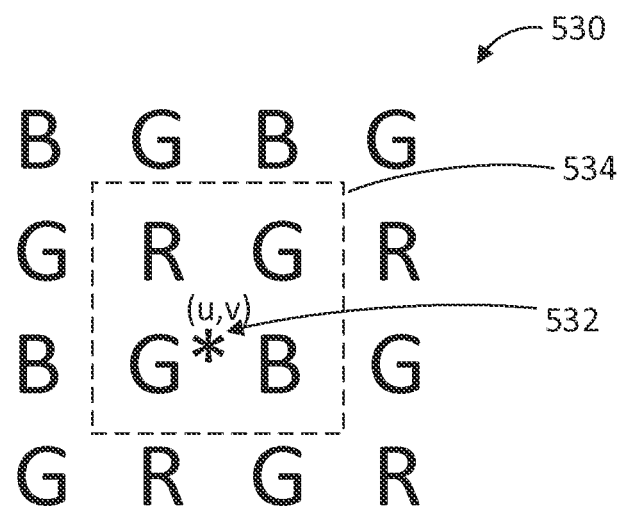
FIG. 5 illustrates an alphabetical mapping of a color filter array that may be used in the calculations to obtain a rectified color image, according to an embodiment.
Figure 5:
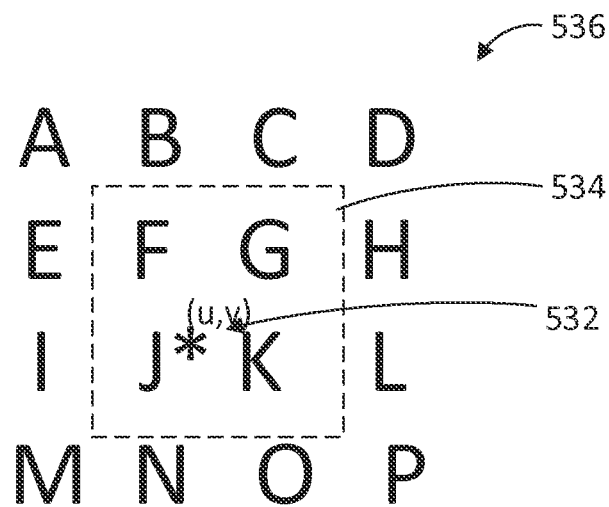
Figure 6:
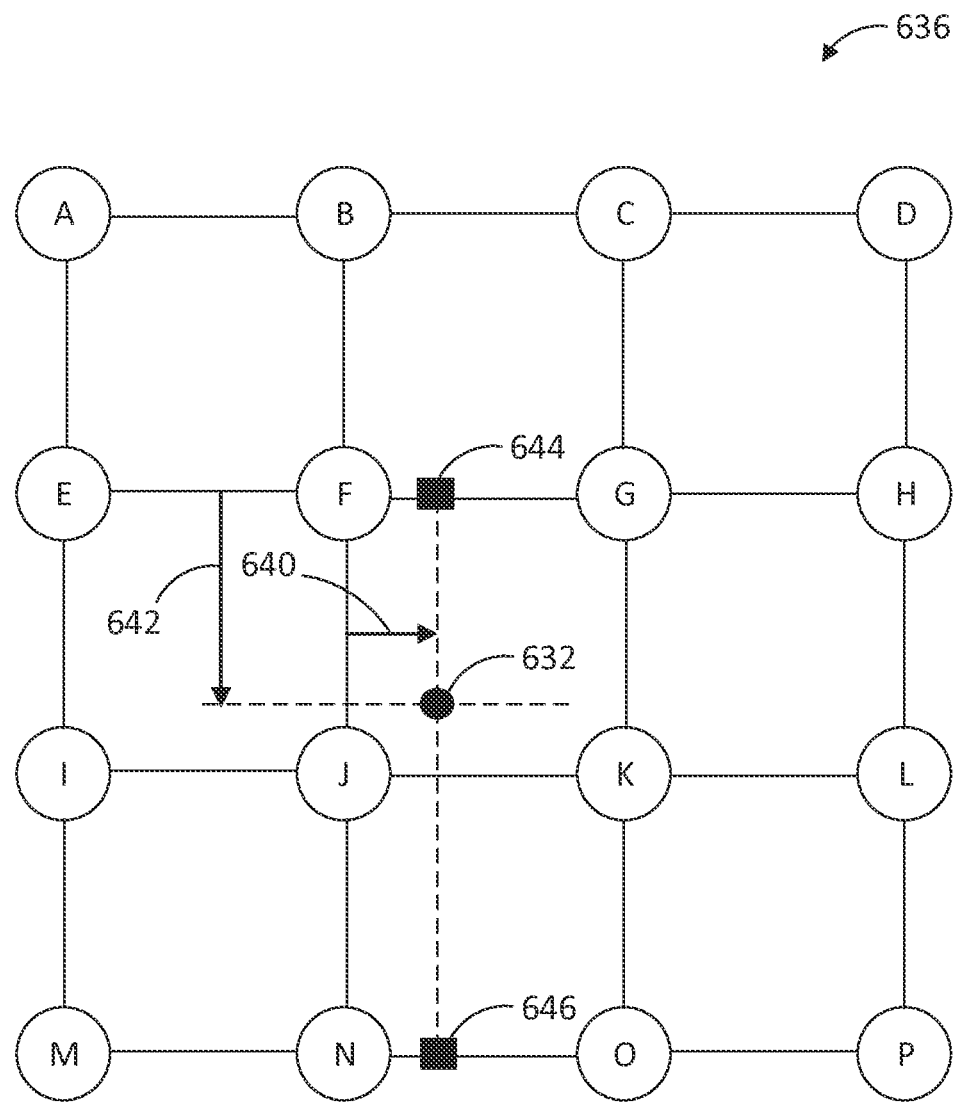
FIG. 6 illustrates an interpolation technique that may be used to determine a red (R) value using a method described herein, according to an embodiment.

FIG. 5 illustrates an alphabetical mapping 536 of a Bayer color filter array 530 that may be used in the calculations to obtain a rectified color image, according to an embodiment. In FIG. 5, a sample point 532 may be located within quad 534, which is of quad type 420 as shown in FIG. 4. Sample point 632 in FIG. 6 is similarly situated in color filter array 636 and may aid in the discussion of this example. Sample point 532/632 may be denoted as at a location (u,v), where u may indicate a horizontal distance (shown as distance 640 in FIG. 6) between the upper left pixel of quad 534 (designated as "F") and sample point 532/632, and v may indicate a vertical distance (shown as distance 642 in FIG. 6) between the upper left pixel of quad 534 and sample point 532/632. Alphabetical mapping 536 is meant to represent color values at corresponding locations of pixels in color filter array 530 in order to simplify understanding of the calculations that follow.

In an embodiment, in order to interpolate a value of the color red for sample point 532 in quad 534, horizontal interpolations of the red values at F and H (indicated at location 644 in FIG. 6) and also at N and P (indicated at location 646 in FIG. 6) may be obtained, followed by a vertical interpolation between results of the horizontal interpolations. Alternatively, as would be understood by those skilled in the relevant art, conducting vertical interpolations first, followed by a horizontal interpolation between results of the vertical interpolations should yield the same result.

In this example, the upper and lower horizontal interpolations may be shown as in the following equations:

$$\text{Upper} = F + (H-F)*u/2 \qquad \text{Eq. 27}$$

$$\text{Lower} = N + (P-N)*u/2 \qquad \text{Eq. 28}$$

The vertical interpolation may then be shown as in the following equation:

$$r = \text{Upper} + (\text{Lower} - \text{Upper})*v/2 \qquad \text{Eq. 29}$$

The resulting interpolated value of r for sample point 532 may then be shown as in the following equations:

$$r = F + (H-F)*u/2 + (N+(P-N)*u/2 - F - (H-F)*u/2)*v/2 \qquad \text{Eq. 30}$$

$$r = F + (H-F)*u/2 + (N-F)*v/2 + (P+F-N-H)*u*v/4 \qquad \text{Eq. 31}$$

In this way, a single set of interpolation calculations may be needed, as opposed to requiring a set of interpolation calculations for demosaicing and another set of interpolation calculations for warping. For any sample points found within the other three types of quads (422, 424, and 426 of FIG. 4) for which values for red or blue are desired, similar calculations would apply.

Figure 7:
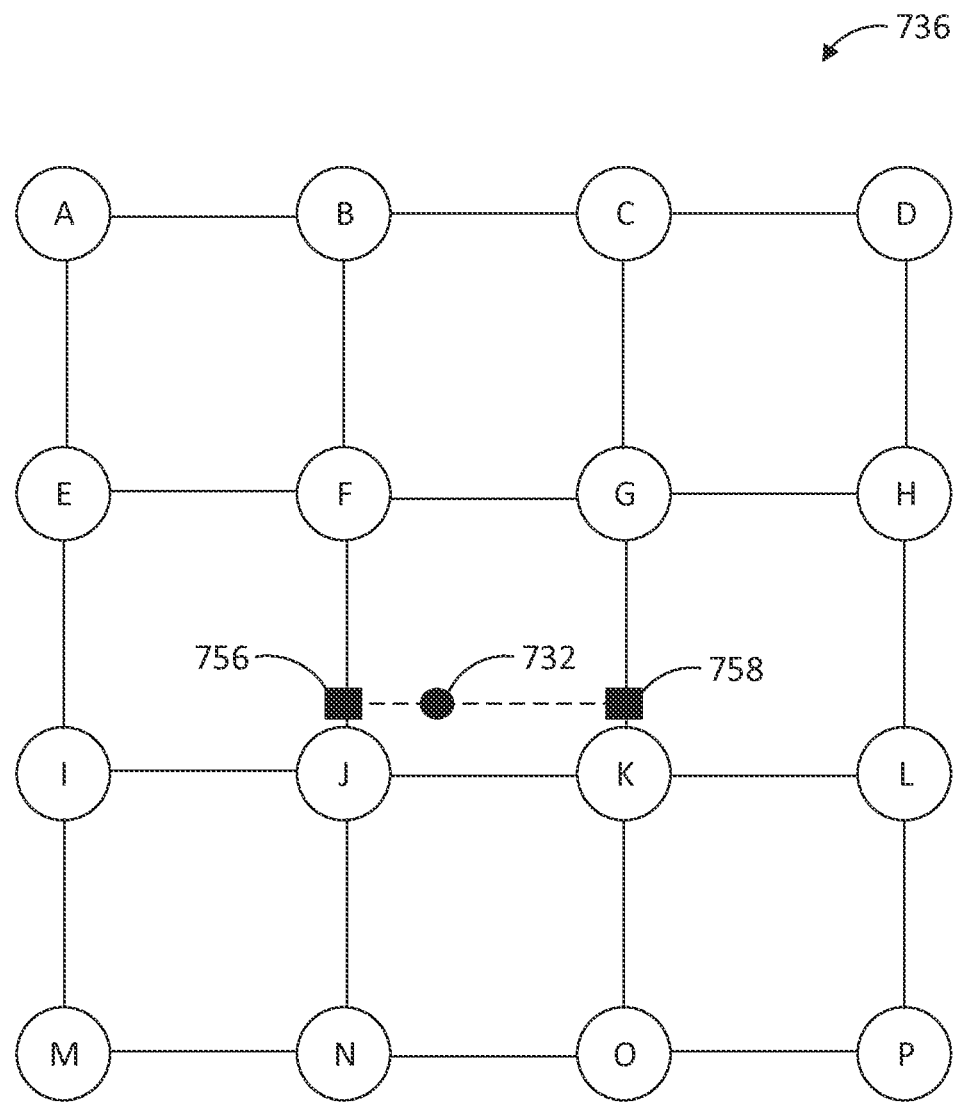
FIG. 7 illustrates an interpolation technique that may be used to determine a green (G) value using a method described herein, according to an embodiment.

Determining the green value at a similarly situated sample point differs due to the frequency and placement of the green values in the color filter array. An example of determining the green value of a similarly situated sample point 732 in color filter array 736 may be shown in FIG. 7, according to an embodiment. In this example, in order to interpolate a value of the color green for sample point 732, vertical interpolations of the green values at B and J (indicated at location 756) and also at G and O (indicated at location 758) may be obtained, followed by a horizontal interpolation between results of the vertical interpolations. In this example, due to the placement of the green values in the color filter array, conducting an opposite interpolation (i.e., conducting horizontal interpolations first followed by a vertical interpolation between results of the horizontal interpolations) may result in a differing value. Therefore, it may be useful to conduct the interpolations both ways and average the two results to obtain an optimal green value at sample point 732.

Figure 8A:
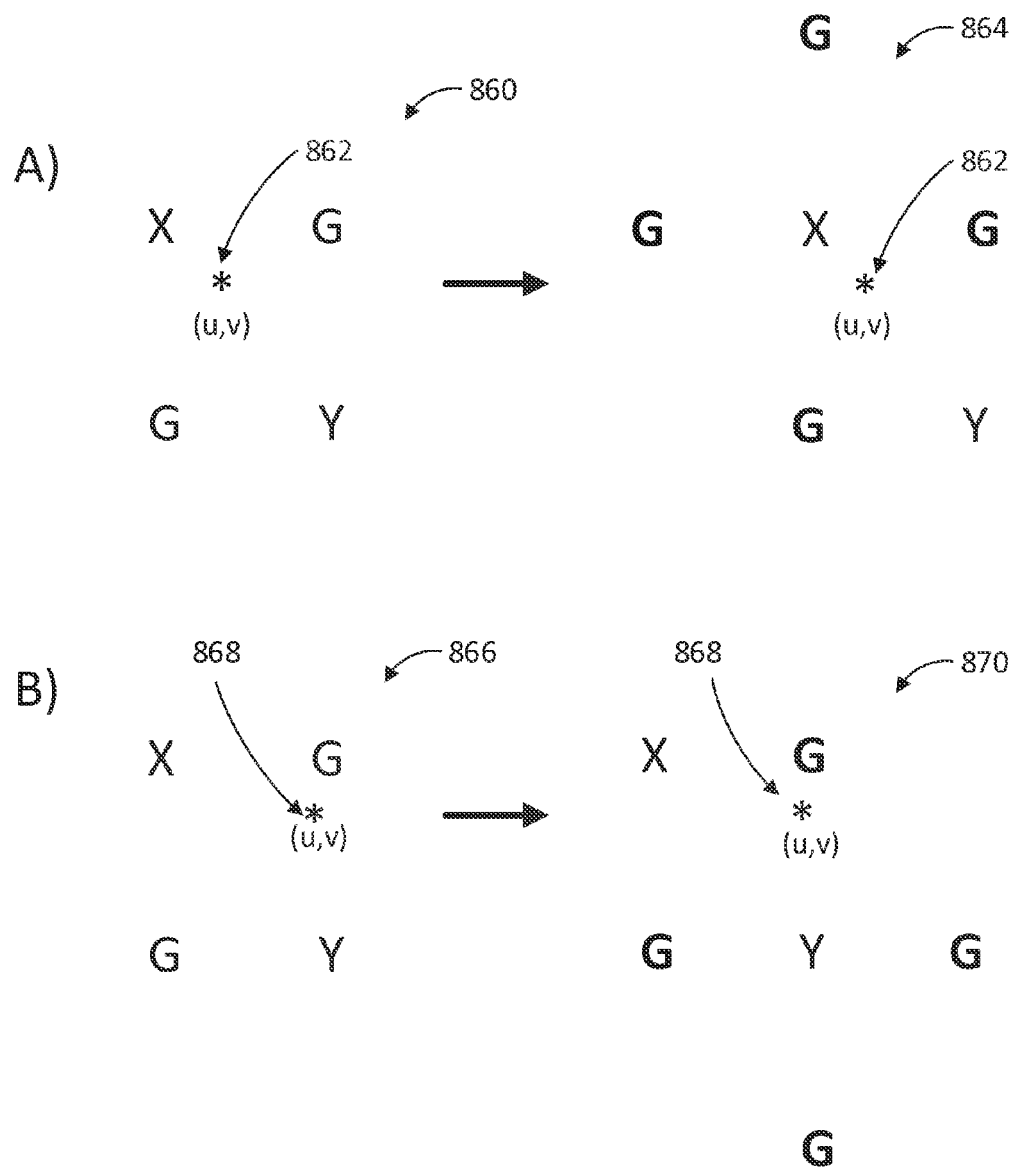
FIGS. 8A and 8B illustrate four examples of an interpolation technique for determining a green (G) value using a method described herein, according to an embodiment.
Figure 8B:
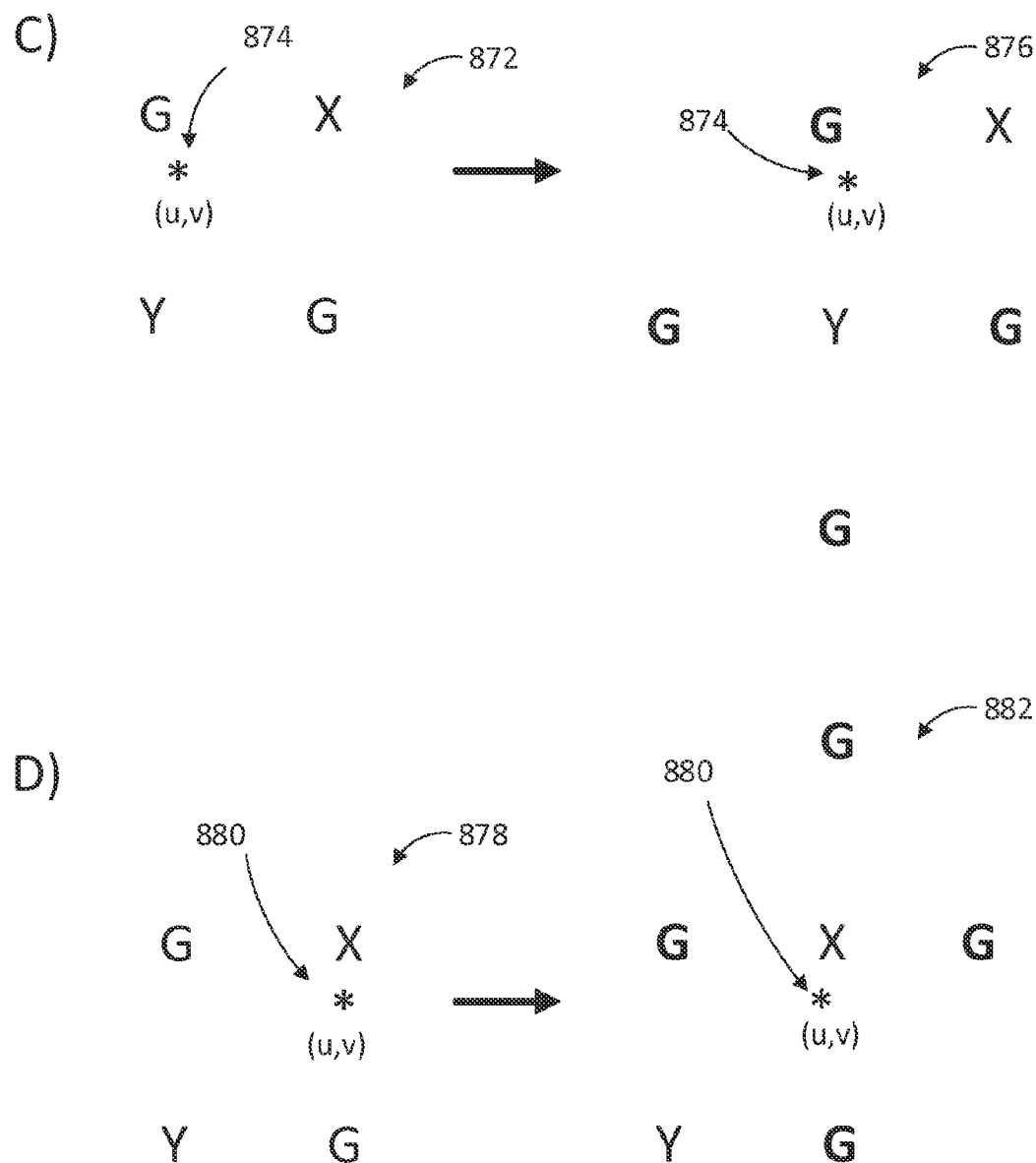
Figure 9A:
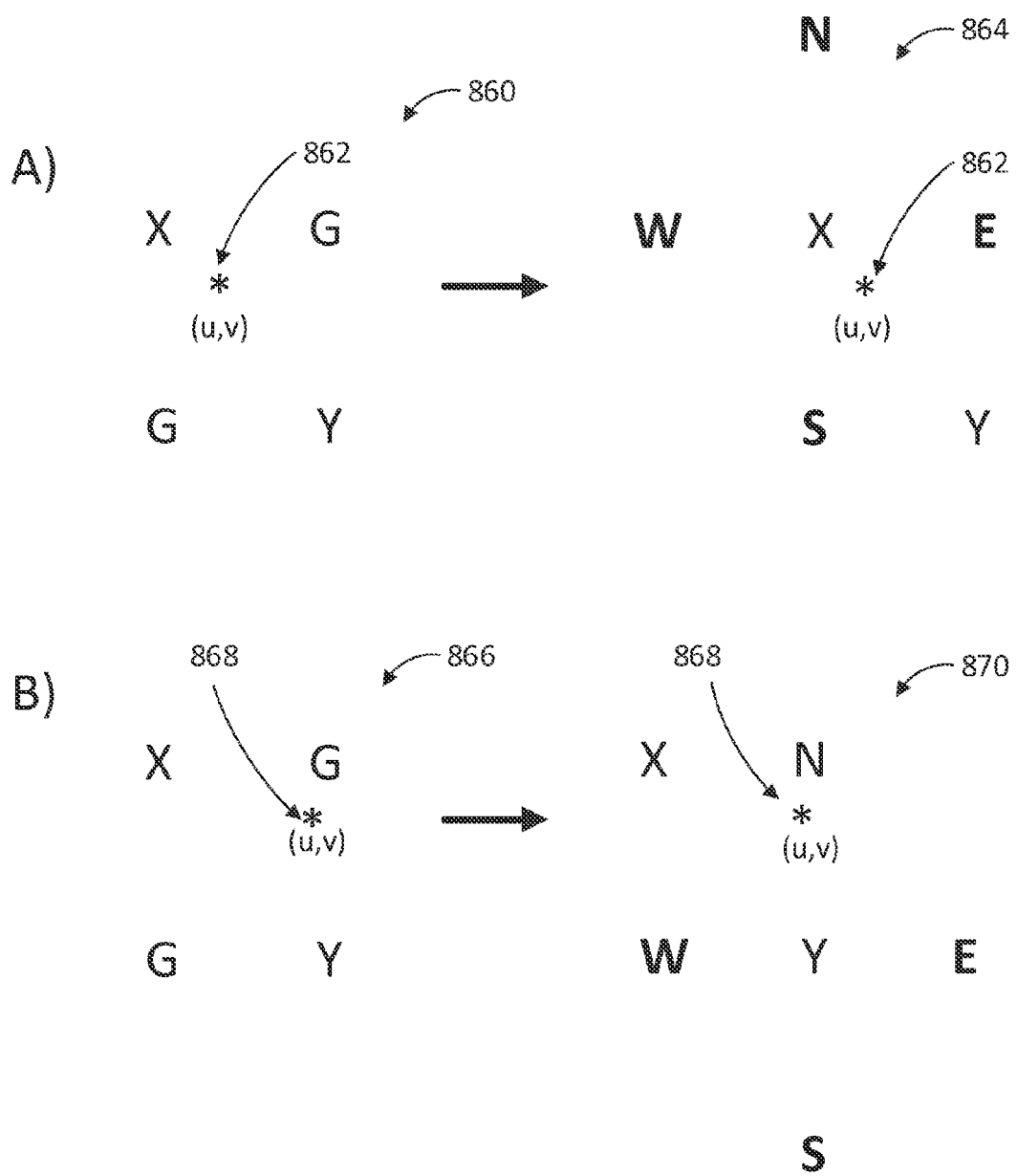
FIGS. 9A and 9B illustrate the same four examples shown in FIGS. 8A and 8B, but with alternative designators for ease of understanding a method described herein, according to an embodiment.
Figure 9B:
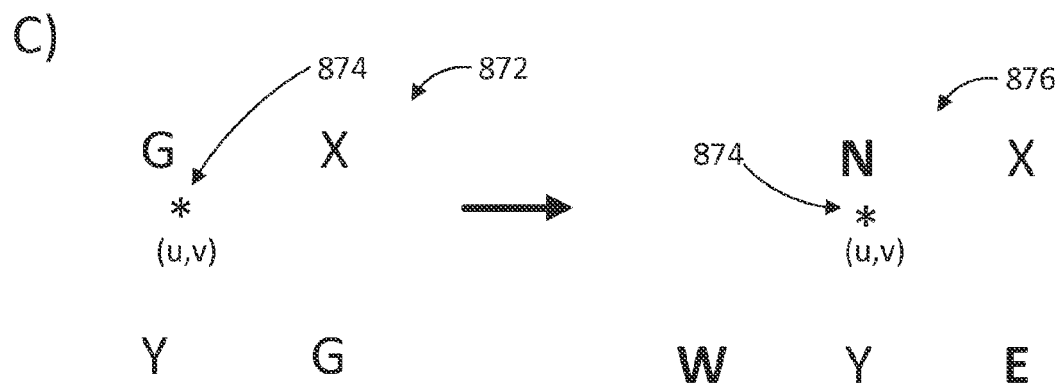
Figure 9B:
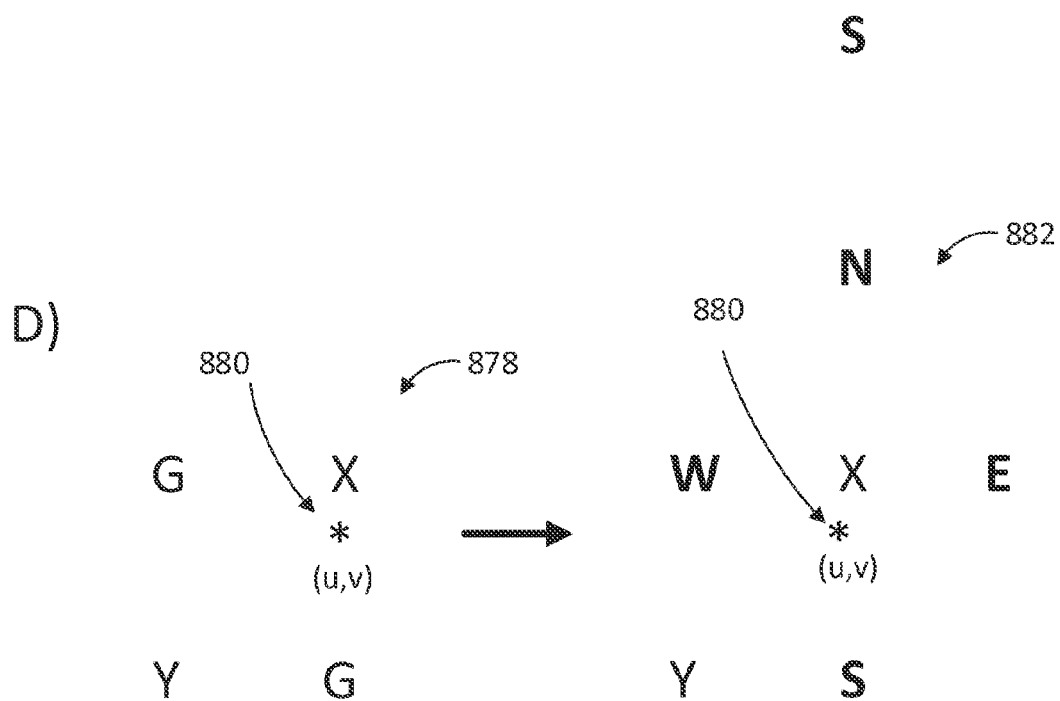

An alternative example of determining the green value of a sample point 862 may be shown in FIGS. 8A-B, 9A-B, and 10, according to an embodiment. In this example, the sampling may be done from four points in a diamond surrounding a sample point. FIGS. 8A and 8B depict four example quads having a sample point denoted that may each need to be processed in a slightly different manner based upon positioning. In each example quad, the letters X and Y represent values of red (R) and blue (B), or vice versa, in a color filter array; the letters G represent green values in the color filter array, and the asterisk represents the sample point. In each example, the quad on the right is shown with more of the green values of the color filter array shown in a diamond pattern surrounding the sample point. In the first example (Example A, shown in FIG. 8A), sample point 862 in quad 860 may be above the diagonal formed by the green pixels of quad 860, in which case diamond 864 formed by the designated green pixels may be used to determine the green value of sample point 862. In the second example (Example B), sample point 868 in quad 866 may be below the diagonal formed by the green pixels of quad 866, in which case diamond 870 formed by the designated green pixels may be used to determine the green value of sample point 868. In the third example (Example C, shown in FIG. 8B), sample point 874 in quad 872 may be below the diagonal formed by the green pixels of quad 872, in which case diamond 876 formed by the designated green pixels may be used to determine the green value of sample point 874. In the fourth example (Example D), sample point 880 in quad 878 may be above the diagonal formed by the green pixels of quad 878, in which case diamond 882 formed by the designated green pixels may be used to determine the green value of sample point 880. For ease of understanding the equations to follow, the green values of the green pixels in diamonds 864, 870, 876, and 882 may be represented by corresponding compass points, N (north) for the top green pixel, S (south) for the bottom green pixel, E (east) for the right green pixel, and W (west) for the left green pixel, as shown in FIGS. 9A and 9B.

In the examples shown in FIGS. 8A-B/9A-B, coordinates of each sample point may be denoted as (u,v), where u may be the horizontal distance between the upper left pixel of the quad and the sample point, and v may be the vertical distance between the upper left pixel of the quad and the sample point. This is shown in the example shown in FIG. 10, which represents the example shown in Example A in FIGS. 8A and 9A. In the example shown in FIG. 10, coordinates of sample point 1090 in color filter array 1036, u may be the horizontal distance 1092 between the upper left pixel of the quad (pixel F) and sample point 1090, and v may be the vertical distance 1094 between the upper left pixel of the quad (pixel F) and sample point 1090. In order to determine the green values at sample point 1090, sampling may be done from the diamond 1095 formed by the two green pixels above and to the left of the quad (pixels B and E) as well as the green pixels in the quad (pixels G and J), similar to the diamond shown in Example A in FIGS. 8A and 9A. Determining values of u and v may be done in a corresponding manner for the other three types of quads, and the diamonds of green values used for the other three types of quads may be those shown in Examples B, C, and D in FIGS. 8A-B and 9A-B.

In order to determine the green values at the sample points, a pair (u',v') may be defined for each of the four green examples shown in FIGS. 8A-B and 9A-B. In the first of the four examples, where the sample point is above a rising diagonal of green pixels (Example A):

$$u'=u+v+1.0 \text{ and } v'=1.0+u-v \qquad \text{Eqs. 32}$$

Figure 10:
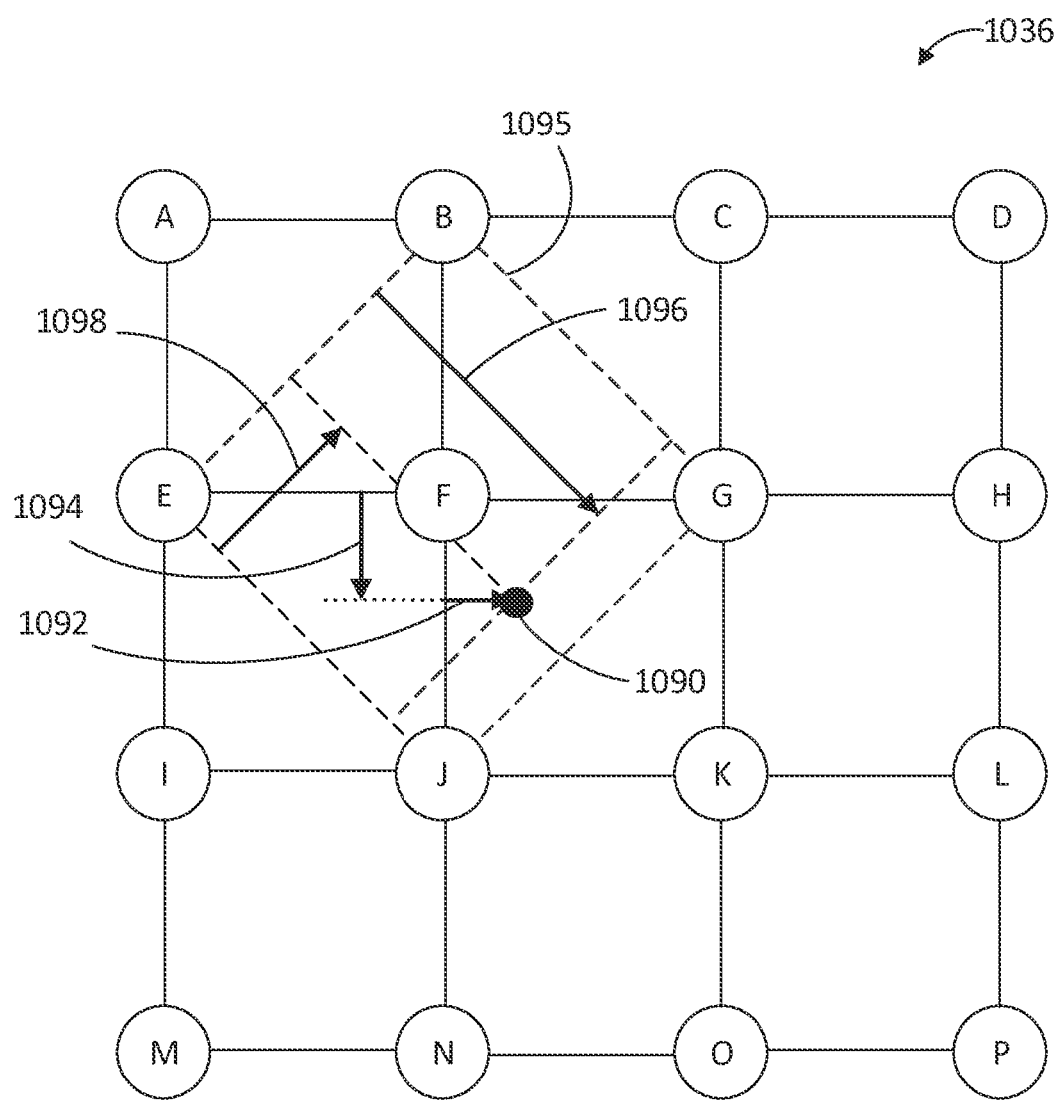
FIG. 10 illustrates an alternative interpolation technique that may be used to determine a green (G) value using a method described herein, according to an embodiment.

(For example, in the example of this quad configuration shown in FIG. 10, u' may be shown by arrow 1096, and v' may be shown by arrow 1098.) In the second of the four examples, where the sample point is below a rising diagonal of green pixels (Example B):

$$u'=u+v-1.0 \text{ and } v'=1.0+u-v \qquad \text{Eqs. 33}$$

In the third of the four examples, where the sample point is below a falling diagonal of green pixels (Example C):

$$u'=u+v \text{ and } v'=2.0+u-v \qquad \text{Eqs. 34}$$

In the last of the four examples, where the sample point is above a falling diagonal of green pixels (Example D):

$$u'=u+v \text{ and } v'=u-v \qquad \text{Eqs. 35}$$

The green value interpolated from the four green source pixels (designated as N, S, E, and W) of any of the four examples may then be calculated as:

$$g=W+(S-W)*u'/2.0+(N-W)*v'/2.0+(W-N-S+E)*u'*v'/4.0 \qquad \text{Eq. 36}$$

As discussed above, and as would be recognized by those of skill in the relevant art, by using the above disclosed methods for the demosaicing and warping of images, multiplicity of interpolation operation sets may be avoided, saving memory, reducing processing time, minimizing artifacts, and reducing cost.

Exemplary Systems

Figure 11:
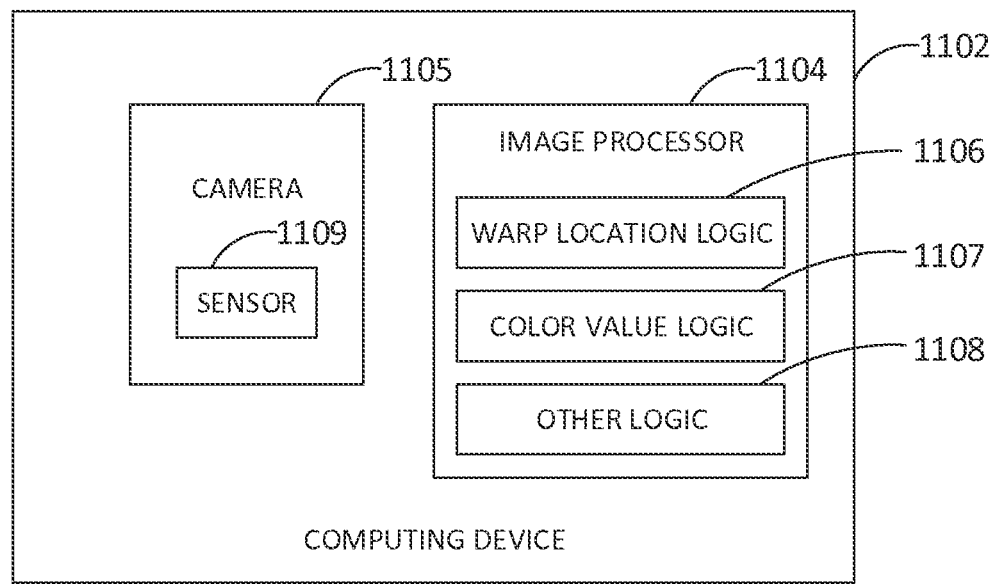
FIG. 11 is a block diagram of an exemplary system in which an embodiment may be implemented.

FIG. 11 is a block diagram of an exemplary system, or computing device, 1102 in which the methods described herein may be implemented, according to an embodiment. Computing device 1102 may include an image processor 1104 and a camera 1105. In an embodiment, image processor 1104 may execute the method described herein using warp location logic unit 1106 and color value logic unit 1107. In embodiments, other logic units 1108 may also be present. For example, a logic unit to execute the storing of results from it or any other logic unit may be present. One skilled in the art would recognize that the functions of the logic units, such as logic units 1106, 1107, and 1108 may be executed by a single logic unit, or any number of logic units. Camera 1105 may include a sensor 1109 on which an image may initially be captured. Computing device 1102 may be, for example, a digital camera device or a smartphone or other computing device capable of taking pictures and/or video. In computing device 1102, the image processor 1104 may execute the process described herein on the image captured at the camera sensor 1109. Alternatively, the image captured at the camera sensor 1109 may be transferred and processed via hardware or software (such as, for example, an image processing software package) at the processor of another computing device. An example of this is shown in FIG. 12.

Figure 12:
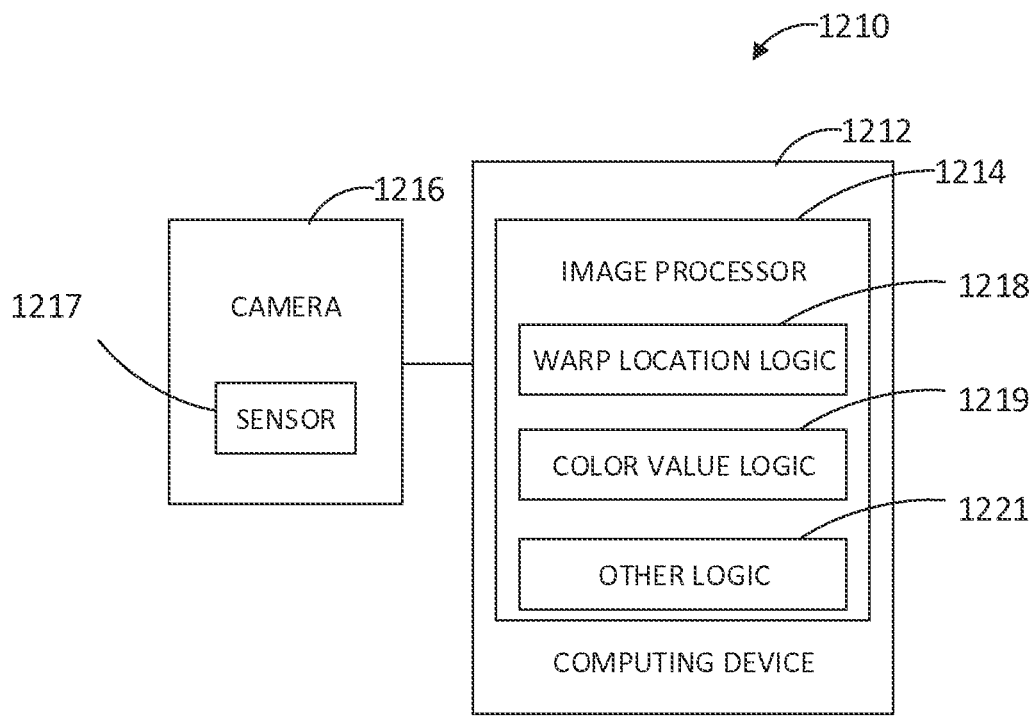
FIG. 12 is a block diagram of another exemplary system in which an embodiment may be implemented.

FIG. 12 is a block diagram of another exemplary system 1210 in which the methods described herein may be implemented, according to an embodiment. System 1210 may include a computing device 1212 having an image processor 1214, and a camera 1216 having a sensor 1217. In system 1210, the camera 1216 may not be a part of the computing device that processes the image according to the process described herein. Instead, the image data captured by camera 1216 at sensor 1217 may be provided to computing device 1212 for processing at image processor 1214 via input/output (I/O) ports (not shown) at the camera 1216 and computing device 1212. The communication between the I/O ports may be, for example, wireless communication, wired communication, or via a hand-carried computer-readable medium such as a compact disk, a flash drive, or other data storage device. In an embodiment, image processor 1214 may execute the methods described herein using warp location logic unit 1218 and color value logic unit 1219. In embodiments, other logic units 1221 may also be present. For example, a logic unit to execute the storing of results from it or any other logic unit may be present. One skilled in the art would recognize that the functions of the logic units, such as logic units 1218, 1219, and 1221 may be executed by a single logic unit, or any number of logic units.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

Figure 13:
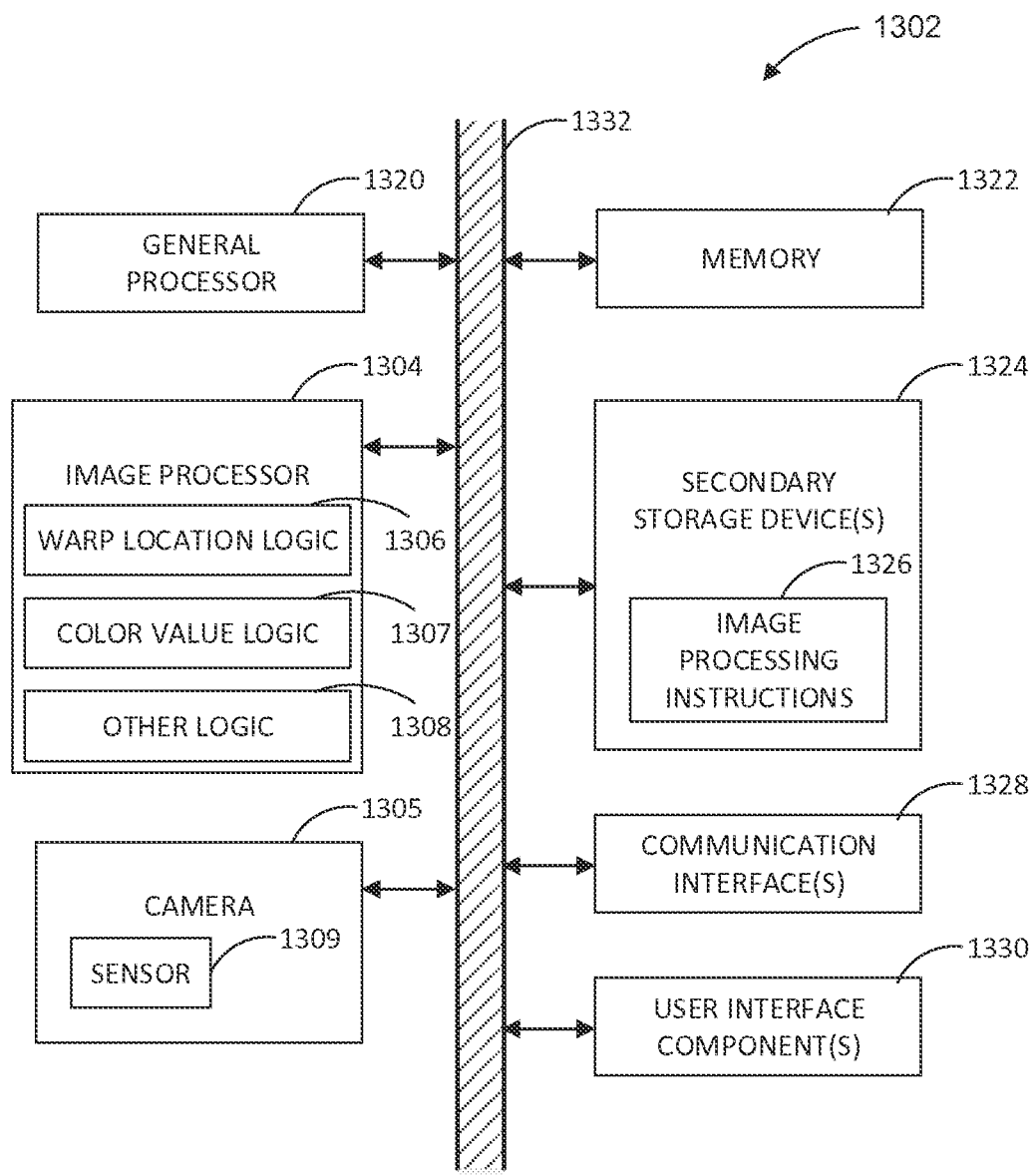
FIG. 13 is a block diagram of an exemplary device in which an embodiment may be implemented.

In an embodiment, some or all of the processing described herein may be implemented as software or firmware. Such a software or firmware embodiment may be illustrated in the context of a computing system 1302 in FIG. 13. Computing system 1302 may represent, for example, computing device 1102 shown in FIG. 11. Computing system 1302 may include one or more central processing unit(s) (CPU), such as general processor 1320, connected to memory 1322, one or more secondary storage devices 1324, a camera 1305 having a sensor 1309, and an image processor 1304 by a bus 1332 or similar mechanism. Alternatively, image processor 1304 may be integrated with general processor 1320. Image processor 1304 may include one or more logic units, such as warp logic unit 1306 and color value logic unit 1307, for example, for carrying out the methods described herein. In embodiments, other logic units 1308 may also be present. For example, a logic unit to execute the storing of results from it or any other logic unit may be present. One skilled in the art would recognize that the functions of the logic units, such as logic units 1306, 1307, and 1308 may be executed by a single logic unit, or any number of logic units. Computing system 1302 may optionally include communication interface(s) 1328 and/or user interface components 1330. The one or more secondary storage devices 1324 may be, for example, one or more hard drives or the like, and may store instructions 1326 to be executed by image processor 1304 and/or general processor 1320. In an embodiment, the general processor 1320 and/or image processor 1304 may be microprocessors, and software, such as instructions 1326, may be stored or loaded into the memory 1322 for execution by general processor 1320 and/or image processor 1304 to provide the functions described herein. Note that while not shown, computing system 1302 may include additional components.

Figure 14:
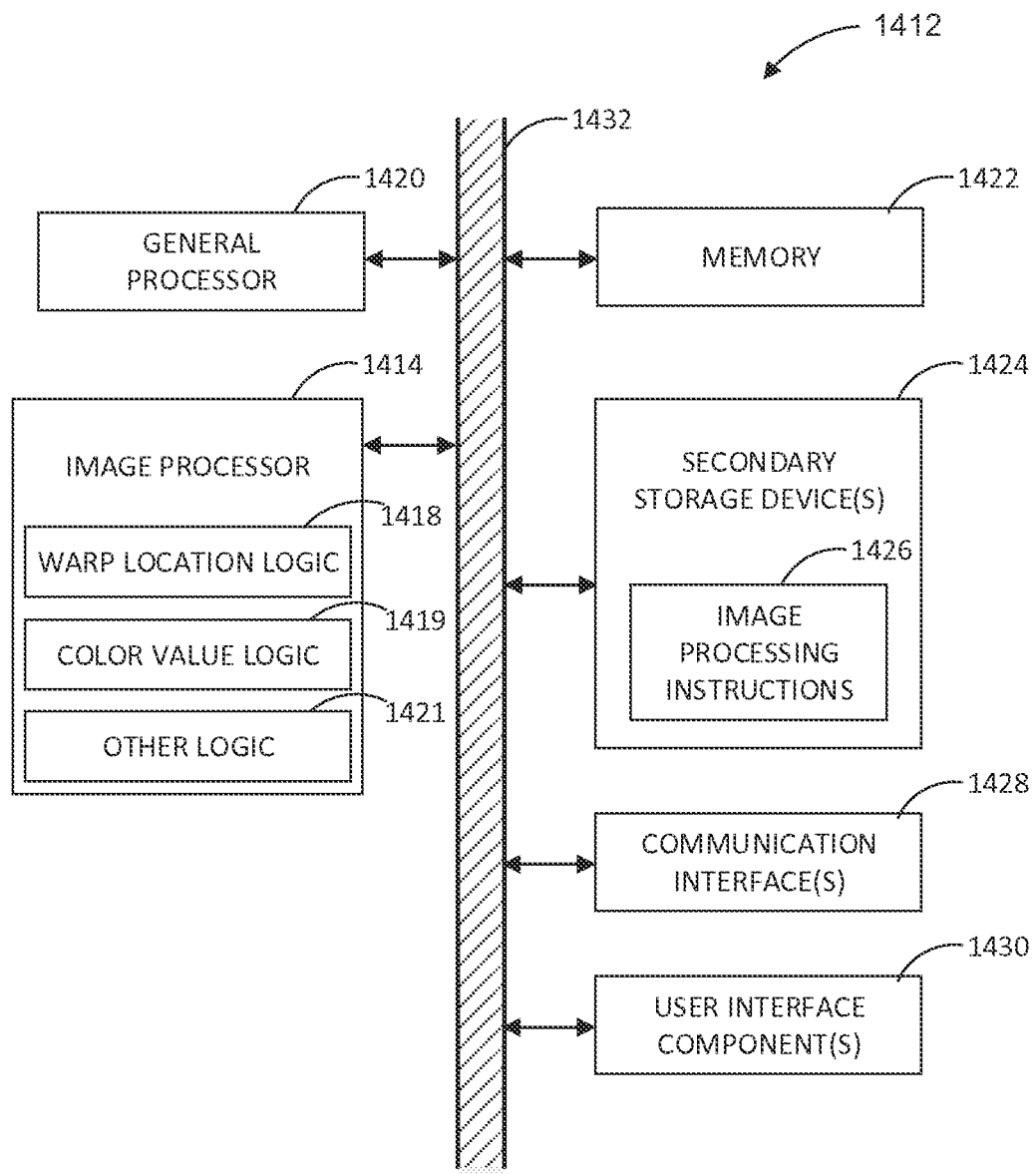
FIG. 14 is a block diagram of another exemplary device in which an embodiment may be implemented.

FIG. 14 is a block diagram of another exemplary computing system 1412 in which an embodiment described herein may be implemented, according to an embodiment. Computing system 1412 may represent, for example, computing device 1212 shown in FIG. 12. Computing system 1412 may include one or more central processing unit(s) (CPU), such as general processor 1420, connected to memory 1422, one or more secondary storage devices 1424, and an image processor 1414 by a bus 1432 or similar mechanism. Alternatively, image processor 1414 may be integrated with general processor 1420. Image processor 1414 may include one or more logic units, such as warp logic unit 1418 and color value logic unit 1419, for example, for carrying out the methods described herein. In embodiments, other logic units 1421 may also be present. For example, a logic unit to execute the storing of results from it or any other logic unit may be present. One skilled in the art would recognize that the functions of the logic units, such as logic units 1418, 1419, and 1421 may be executed by a single logic unit, or any number of logic units. Computing system 1412 may include communication interface(s) 1428 and/or user interface components 1430. In an embodiment, communication interface(s) 1428 may be used to provide image data captured by a camera sensor to computing system 1412 for processing using methods described herein. The one or more secondary storage devices 1424 may be, for example, one or more hard drives or the like, and may store instructions 1426 to be executed by image processor 1414 and/or general processor 1420. In an embodiment, the general processor 1420 and/or image processor 1414 may be microprocessors, and software, such as instructions 1426, may be stored or loaded into the memory 1422 for execution by general processor 1420 and/or image processor 1414 to provide the functions described herein. Note that while not shown, computing system 1412 may include additional components.

Figure 15:
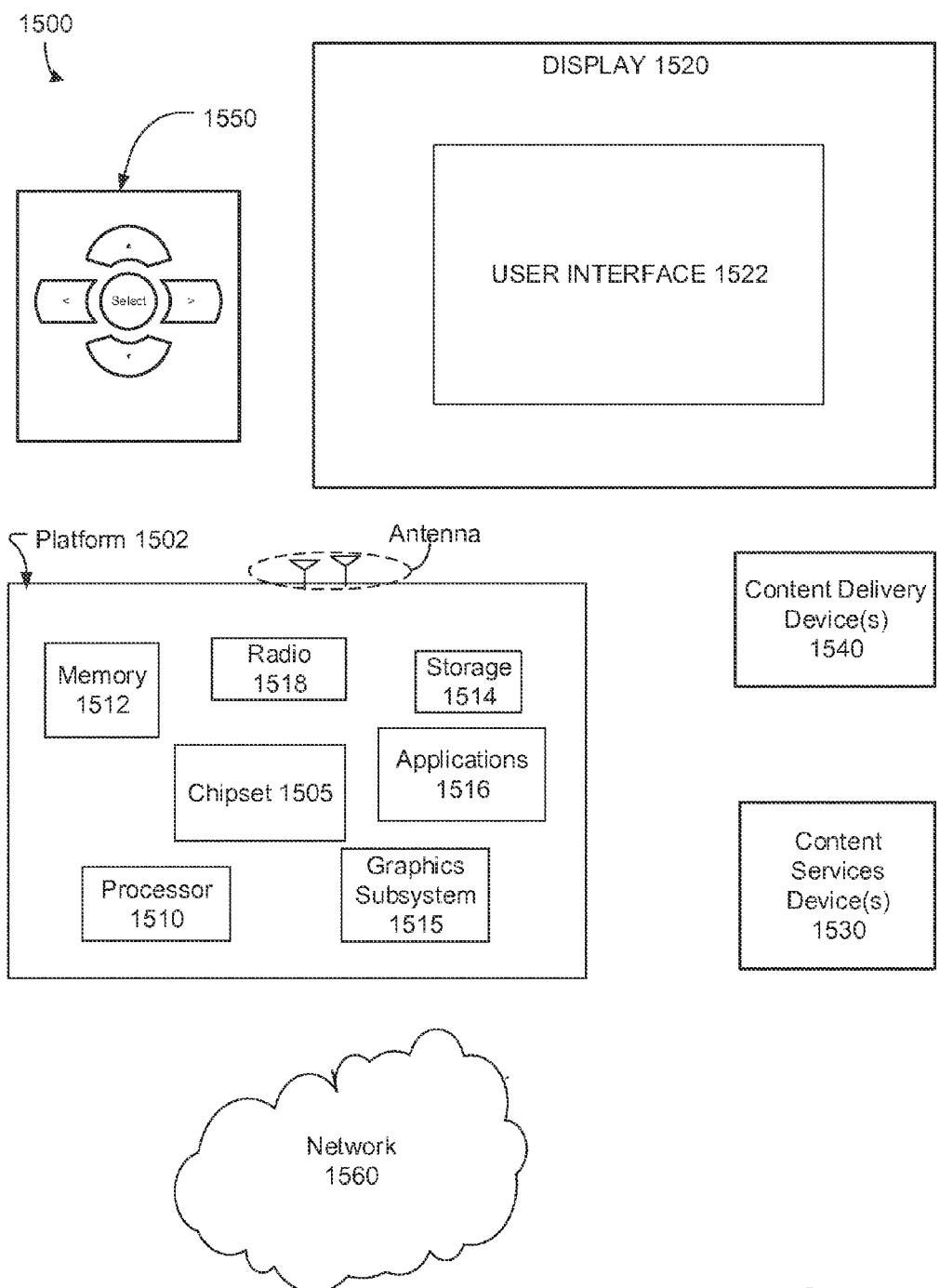
FIG. 15 illustrates an information system in which an embodiment may be implemented.

The systems, methods, and computer program products described above may be a part of a larger information system. FIG. 15 illustrates such an embodiment, as a system 1500. In embodiments, system 1500 may be a media system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1500 comprises a platform 1502 coupled to a display 1520. Platform 1502 may receive content from a content device such as content services device(s) 1530 or content delivery device(s) 1540 or other similar content sources. A navigation controller 1550 comprising one or more navigation features may be used to interact with, for example, platform 1502 and/or display 1520. Each of these components is described in more detail below.

In embodiments, platform 1502 may comprise any combination of a chipset 1505, processor 1510, memory 1512, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1510 may comprise dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1514 may comprise technology to increase the storage performance enhanced protection for valuable digital media when multiple hard drives are included, for example.

Graphics subsystem 1515 may perform processing of images such as still or video for display. Graphics subsystem

1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 could be integrated into processor 1510 or chipset 1505. Graphics subsystem 1515 could be a stand-alone card communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 1518 may operate in accordance with one or more applicable standards in any version.

In embodiments, display 1520 may comprise any television type monitor or display. Display 1520 may comprise, for example, a computer display screen, touch screen display, video monitor, television-like device, and/or a television. Display 1520 may be digital and/or analog. In embodiments, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In embodiments, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In embodiments, content services device(s) 1530 may comprise a cable television box, personal computer, network, telephone, Internet enabled devices or appliance capable of delivering digital information and/or content, and any other similar device capable of unidirectionally or bidirectionally communicating content between content providers and platform 1502 and/display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 receives content such as cable television programming including media information, digital information, and/or other content. Examples of content providers may include any cable or satellite television or radio or Internet content providers. The provided examples are not meant to limit embodiments of the invention.

In embodiments, platform 1502 may receive control signals from navigation controller 1550 having one or more navigation features. The navigation features of controller 1550 may be used to interact with user interface 1522, for example. In embodiments, navigation controller 1550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be echoed on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In embodiments, controller 1550 may not be a separate component but integrated into platform 1502 and/or display 1520. Embodiments, however, are not limited to the elements or in the context shown or described herein.

In embodiments, drivers (not shown) may comprise technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 when the platform is turned "off." In addition, chipset 1505 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the invention.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
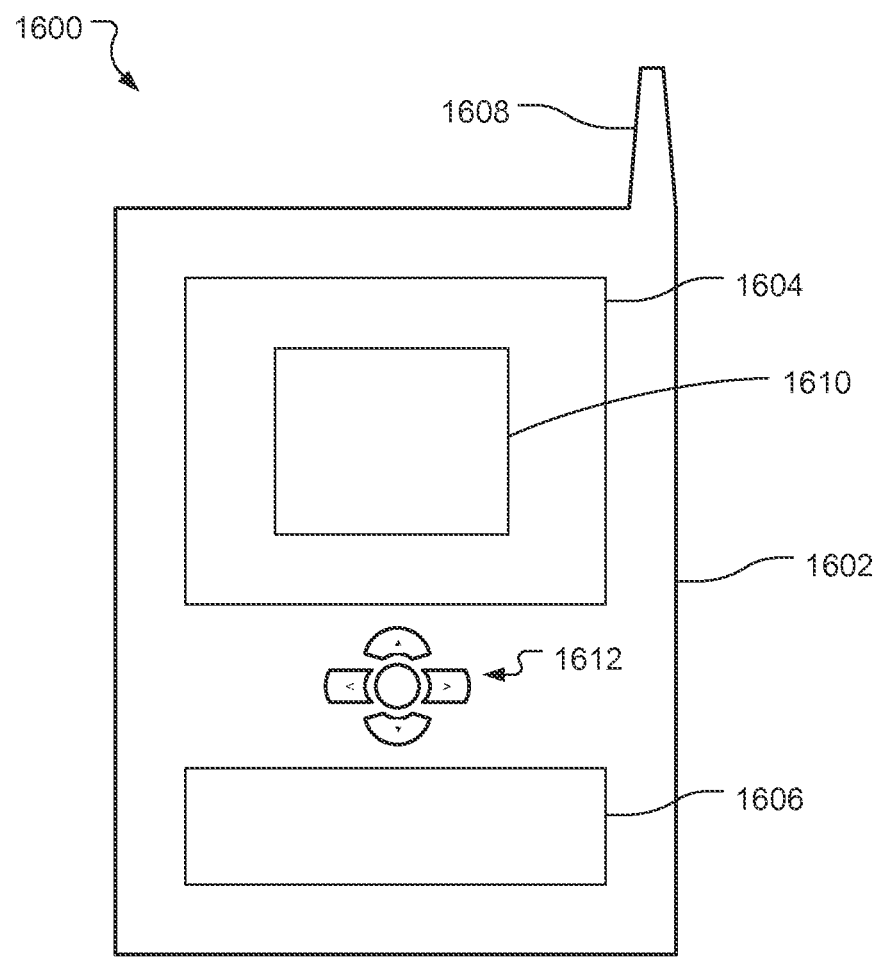
FIG. 16 illustrates a mobile information device in which an embodiment may be implemented.

As described above, system 1500 may be embodied in varying physical styles or form factors. FIG. 16 illustrates embodiments of a small form factor device 1600 in which system 1500 may be embodied. In embodiments, for example, device 1600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may comprise a housing 1602, a display 1604, an input/output (I/O) device 1606, and an antenna 1608. Device 1600 also may comprise navigation features 1612. Display 1604 may comprise any suitable display unit for displaying information appropriate for a mobile computing device. I/O device 1606 may comprise any suitable I/O device for entering information into a mobile computing device. Examples for I/O device 1606 may include an alphanumeric keyboard, a numeric keypad, a touch pad, input keys, buttons, switches, rocker switches, microphones, speakers, voice recognition devices and software, and so forth. Information also may be entered into device 1600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The following examples pertain to further embodiments.

Example 1 may include an image processing system, comprising a first circuit logic unit configured to, for each pixel location (i,j) and for each color channel in a color image, determine a warped location (i',j') in a color filter array; and a second circuit logic unit configured to, for each pixel location (i,j) and for each color channel in the color image, determine a color value of the color channel at location (i',j') in the color filter array.

In Example 2, the subject matter of Example 1 may optionally include a third circuit logic unit configured to, for each pixel location (i,j) and for each color channel in the color image, store the determined color value.

Example 3 may include the subject matter of any one of Examples 1-2, wherein the determining the color value by the second circuit logic unit comprises interpolating the color value of the color channel at location (i',j') in the color filter array.

Example 4 may include the subject matter of Example 3, wherein the interpolating the color value comprises interpolating the color value of the color channel at location (i',j') in the color filter array by bilinear interpolation.

Example 5 may include the subject matter of Example 3, wherein the interpolating the color value comprises interpolating the color value of the color channel at location (i',j') in the color filter array by bicubic interpolation.

Example 6 may include the subject matter of Example 3, wherein the interpolating the color value comprises interpolating the color value of the color channel at location (i',j') in the color filter array by nearest neighbor interpolation.

Example 7 may include the subject matter of any one of Examples 1-6, wherein the color filter array comprises a Bayer pattern.

Example 8 may include a computer program product for image processing that includes at least one non-transitory computer readable medium having computer program logic stored therein, the computer program logic including logic to cause a processor to, for each pixel location (i,j) and for each color channel in a color image, determine a warped location (i',j') in a color filter array; and logic to cause the processor to, for each pixel location (i,j) and for each color channel in the color image, determine a color value of the color channel at location (i',j') in the color filter array.

Example 9 may include the subject matter of Example 8, wherein the computer program logic further includes logic to cause the processor to, for each pixel location (i,j) and for each color channel in the color image, store the determined color value.

Example 10 may include the subject matter of any one of Examples 8-9, wherein the logic to cause the processor to determine the color value comprises logic to cause the processor to interpolate the color value of the color channel at location (i',j') in the color filter array.

Example 11 may include the subject matter of Example 10, wherein the logic to cause the processor to interpolate the color value comprises logic to cause the processor to interpolate the color value of the color channel at location (i',j') in the color filter array by bilinear interpolation.

Example 12 may include the subject matter of Example 10, wherein the logic to cause the processor to interpolate the color value comprises logic to cause the processor to interpolate the color value of the color channel at location (i',j') in the color filter array by bicubic interpolation.

Example 13 may include the subject matter of Example 10, wherein the logic to cause the processor to interpolate the color value comprises logic to cause the processor to interpolate the color value of the color channel at location (i',j') in the color filter array by nearest neighbor interpolation.

Example 14 may include the subject matter of any one of Examples 8-13, wherein the color filter array comprises a Bayer pattern.

Example 15 may include an apparatus for image processing, comprising means for, for each pixel location (i,j) and for each color channel in a color image, determining a warped location (i',j') in a color filter array; and means for, for each pixel location (i,j) and for each color channel in the color image, determining, by the image processing device, a color value in the color channel at location (i',j') of the color filter array.

In Example 16, the subject matter of Example 15 may optionally include means for, for each pixel location (i,j) and for each color channel in the color image, storing the determined color value.

Example 17 includes the subject matter of any one of Examples 15-16, wherein the means for determining the color value comprises means for interpolating the color value of the color channel at location (i',j') in the color filter array.

Example 18 includes the subject matter of Example 17, wherein the means for interpolating comprises means for interpolating the color value of the color channel at location (i',j') in the color filter array by bilinear interpolation.

Example 19 includes the subject matter of Example 17, wherein the means for interpolating comprises means for interpolating the color value of the color channel at location (i',j') in the color filter array by bicubic interpolation.

Example 20 includes the subject matter of Example 17, wherein the means for interpolating comprises means for interpolating the color value of the color channel at location (i',j') in the color filter array by nearest neighbor interpolation.

Example 21 includes the subject matter of any one of Examples 15-20, wherein the color filter array comprises a Bayer pattern.

Example 22 may include a method of image processing, comprising, for each pixel location (i,j) and for each color channel in a color image, determining, by an image processing device, a warped location (i',j') in a color filter array, and determining, by the image processing device, a color value in the color channel at location (i',j') of the color filter array.

In Example 23, the subject matter of Example 22 may optionally include, for each pixel location (i,j) and for each color channel in a color image, storing the determined color value.

Example 24 may include the subject matter of any one of Examples 22-23, wherein the determining the color value comprises interpolating the color value of the color channel at location (i',j') in the color filter array.

Example 25 may include the subject matter of Example 24, wherein the interpolating the color value comprises interpolating the color value of the color channel at location (i',j') in the color filter array by bilinear interpolation.

Example 26 may include the subject matter of Example 24, wherein the interpolating the color value comprises interpolating the color value of the color channel at location (i',j') in the color filter array by bicubic interpolation.

Example 27 may include the subject matter of Example 24, wherein the interpolating the color value comprises interpolating the color value of the color channel at location (i',j') in the color filter array by nearest neighbor interpolation.

Example 28 may include the subject matter of any one of Examples 22-27, wherein the color filter array comprises a Bayer pattern.

Example 29 may include at least one machine readable medium comprising a plurality of instructions that in response to being executed on a computing device, cause the computing device to carry out a method according to any one of Examples 22-28.

Example 30 may include a computer system to perform the method of any one of Examples 22-28.

Example 31 may include an apparatus configured to perform the method of any one of Examples 22-28.

Example 32 may include a machine to perform the method of any one of Examples 22-28.

Example 33 may include an apparatus comprising means for performing the method of any one of Examples 22-28.

Example 34 may include a computing device comprising a chipset according to any one of Examples 22-28 and memory to process images.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the exemplary embodiments disclosed herein.

As may be used in this application and in the claims, a list of items joined by the term "one or more of" can mean any combination of the listed terms. For example, the phrases "one or more of A, B or C" can mean A; B; C; A and B; A and C; B and C; or A, B and C.

What is claimed is:

1. An image processing system, comprising:
a memory; and
a processor to simultaneously demosaic and warp a color filter array to generate a color image without needing an intermediary image in communication with the memory, wherein the processor is to, for a pixel location (i,j) and for a color channel in a color image,
determine a warped location (i' j') based on application of a function to a pixel location (I,j) to correct for distortions introduced by an optical system; and
determine a color value in the color channel at warped location (i',j') based on an interpolation of values of the color filter array to generate the color value at the warped location (i',j'), wherein the interpolation comprises an average of first and second interpolations, wherein the first interpolation comprises a horizontal interpolation followed by a vertical interpolation and the second interpolation comprises a vertical interpolation followed by a horizontal interpolation.

2. The image processing system of claim 1, wherein the processor is further to:
for the pixel location (i,j) and for the color channel in the color image, store the determined color value.

3. The image processing system of claim 1, wherein the interpolation comprises a bilinear interpolation.

4. The image processing system of claim 1, wherein the interpolation comprises a bicubic interpolation.

5. The image processing system of claim 1, wherein the interpolation comprises a nearest neighbor interpolation.

6. The image processing system of claim 1, wherein the color filter array comprises a Bayer pattern.

7. The image processing system of claim 1, wherein the function comprises at least one of a polynomial function or a rational function.

8. A computer program product for image processing, including at least one non-transitory computer readable medium having computer program logic stored therein, the computer program logic including:
logic to cause a processor to, for a pixel location (i,j) and for a color channel in a color image, determine a warped location (i',j') based on application of a function to the pixel location (i,j) to correct for distortions introduced by an optical system; and
logic to cause the processor to, for the pixel location (i,j) and for the color channel in the color image, determine a color value of the color channel at warped location (i',j') based on an interpolation of values of the color filter array to generate the color value at the warped location (i', j'), wherein the interpolation comprises an average of first and second interpolations, wherein the first interpolation comprises a horizontal interpolation followed by a vertical interpolation and the second interpolation comprises a vertical interpolation followed by a horizontal interpolation.

9. The computer program product of claim 8, wherein the computer program logic further includes:
logic to cause the processor to, for the pixel location (i,j) and for the color channel in the color image, store the determined color value.

10. The computer program product of claim 8, wherein the interpolation comprises a bilinear interpolation.

11. The computer program product of claim 8, wherein the interpolation comprises a bicubic interpolation.

12. The computer program product of claim 8, wherein the interpolation comprises a nearest neighbor interpolation.

13. The computer program product of claim 8, wherein the function comprises at least one of a polynomial function or a rational function.

14. An apparatus for image processing, comprising:
means for, for a pixel location (i,j) and for a color channel in a color image, determining a warped location (i',j') based on applying a function to the pixel location (i,j) to correct for distortions introduced by an optical system; and
means for, for the pixel location (i,j) and for the color channel in the color image, determining a color value in the color channel at warped location (i',j') based on an interpolation of values of the color filter array to generate the color value at the warped location (i', j'), wherein the interpolation comprises performing a first interpolation with a horizontal interpolation followed by a vertical interpolation and a second interpolation with a vertical interpolation followed by a horizontal interpolation and averaging the first and second interpolations.

15. The apparatus of claim 14, further comprising:
means for, for the pixel location (I,j) and for the color channel in the color image, storing the determined color value.

16. The apparatus of claim 14, wherein the interpolation comprises a bilinear interpolation.

17. The apparatus of claim 14, wherein the interpolation comprises a bicubic interpolation.

18. The apparatus of claim 14, wherein the interpolation comprises a nearest neighbor interpolation.

19. The apparatus of claim 14, wherein the function comprises at least one of a polynomial function or a rational function.

20. A method of image processing, comprising:
simultaneously demosaicing and warping a color filter array to generate a color image without needing an intermediary image by, for a pixel location (i,j) and for a color channel in a color image:
determining, by an image processing device, a warped location (i',j') based on applying a function to the pixel location (I,j) to correct for distortions introduced by an optical system; and
determining, by the image processing device, a color value in the color channel at warped location (i',j') based on an interpolation of values of the color filter array to generate the color value at the warped location (i',j'), wherein the interpolation comprises performing a first interpolation with a horizontal interpolation followed by a vertical interpolation and a second interpolation with a vertical interpolation followed by a horizontal interpolation and averaging the first and second interpolations.

21. The method of claim 20, further comprising, for the pixel location (I,j) and for each color channel in the color image:
storing the determined color value.

22. The method of claim 20, wherein the interpolation of values comprises a bilinear interpolation.

23. The method of claim 20, wherein the interpolation of values comprises a bicubic interpolation.

24. The method of claim 20, wherein the interpolation of values comprises a nearest neighbor interpolation.

25. The method of claim 20, wherein the function comprises at least one of a polynomial function or a rational function.

\* \* \* \* \*